United States Patent
Li et al.

(10) Patent No.: US 11,134,154 B2
(45) Date of Patent: Sep. 28, 2021

(54) CALL-OUT METHOD AND APPARATUS HAVING IMMEDIATE CALLBACK FUNCTION

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Guanshi Li, Beijing (CN); Qingshan Wang, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 146 days.

(21) Appl. No.: 16/500,211

(22) PCT Filed: Apr. 10, 2018

(86) PCT No.: PCT/CN2018/082423
§ 371 (c)(1),
(2) Date: Oct. 2, 2019

(87) PCT Pub. No.: WO2018/196595
PCT Pub. Date: Nov. 1, 2018

(65) Prior Publication Data
US 2021/0105363 A1    Apr. 8, 2021

(30) Foreign Application Priority Data
Apr. 24, 2017  (CN) .......................... 201710273285.X (51) Int. Cl.
*H04M 3/523* (2006.01)
*H04M 3/51* (2006.01)

(52) U.S. Cl.
CPC ....... *H04M 3/5233* (2013.01); *H04M 3/5175* (2013.01); *H04M 3/5183* (2013.01); *H04M 3/5231* (2013.01)

(58) Field of Classification Search
None
See application file for complete search history.

(56) References Cited

U.S. PATENT DOCUMENTS 5,155,761 A * 10/1992 Hammond .............. H04M 3/51
379/88.2
8,638,925 B1 * 1/2014 Billman .............. H04M 3/5233
379/265.12

(Continued)

FOREIGN PATENT DOCUMENTS

| CN | 1331882 A | 1/2002 |
| CN | 1882019 A | 12/2006 |

(Continued)

OTHER PUBLICATIONS

Chinese Patent Office Action for Application No. 201710273285.X dated Oct. 8, 2019.

(Continued)

*Primary Examiner* — Harry S Hong
(74) *Attorney, Agent, or Firm* — Michael Best & Friedrich LLP (57) ABSTRACT

The invention provides a call-out method and apparatus for an immediate callback, an electronic device, and a computer readable medium, and can solve the problem that the existing call-out scheme of the preview type cannot effectively implement an immediate callback, and can improve user experience, increase an agent utilization rate, and reduce a pressure on a system caused by frequent scheduling of timed tasks. The call-out method for an immediate callback of the invention comprises: receiving an immediate callback request of a user, the immediate callback request including (Continued)

a callback number and submitted service data; determining, according to pre-stored mapping relationships between service data and agent's telephone skills, agents processing the submitted service data; and judging whether a ready agent exists in the agents, and if so, immediately calling the callback number; otherwise, calling the callback number when there is a ready agent.

9 Claims, 3 Drawing Sheets

(56) References Cited

U.S. PATENT DOCUMENTS

| | | | |
|---|---|---|---|
| 2013/0067489 A1* | 3/2013 | Fields, Jr. | G06F 9/542 719/314 |
| 2014/0153703 A1* | 6/2014 | Desai | H04M 3/5166 379/88.01 |
| 2016/0105558 A1 | 4/2016 | Zgardovski et al. | |

FOREIGN PATENT DOCUMENTS

| | | | |
|---|---|---|---|
| CN | 101742003 | A | 6/2010 |
| CN | 101742004 | A | 6/2010 |
| CN | 101958982 | A | 1/2011 |
| CN | 102572136 | A | 7/2012 |
| CN | 103024217 | A | 4/2013 |
| CN | 103533189 | A | 1/2014 |
| CN | 103684874 | A | 3/2014 |
| CN | 104751340 | A | 7/2015 |
| CN | 105404927 | A | 3/2016 |
| CN | 105898087 | A | 8/2016 |
| CN | 106357943 | A | 1/2017 |
| CN | 106506883 | A | 3/2017 |

OTHER PUBLICATIONS

Chinese Patent Office Action for Application No. 201710273285.X dated Mar. 16, 2020.
Chinese Patent Office Notice of Reexamination for Application No. 201710273285 dated Jan. 8, 2021 (9 pages including statement of relevance).
English translation of International Search Report and Written Opinion for Application No. PCT/CN2018/082423 dated Jun. 22, 2018 (5 pages).
Chinese Patent Office Action for Application No. 201710273285.X dated Jun. 9, 2020 (7 pages, Statement of relevance included).

* cited by examiner

CALL-OUT METHOD AND APPARATUS HAVING IMMEDIATE CALLBACK FUNCTION

CROSS-REFERENCE TO RELATED APPLICATION(S)

This is a U.S. national stage entry of International Patent Application No. PCT/CN2018/082423, filed on Apr. 10, 2018, which claims priority to Chinese Patent Application No. 201710273285.X, filed on Apr. 24, 2017, the entire contents of each of which are fully incorporated herein by reference.

TECHNICAL FIELD

The invention relates to the computer technical field, and in particular relates to a call-out method and apparatus for an immediate callback, an electronic device, and a computer readable medium.

BACKGROUND ART

With a continuous development of a market prospect of a call center, a call-out type service is more and more popular in the market, and customer service staff actively contacting customers becomes a new development direction of the call center. The customer's requirements for timeliness of communication are getting higher and higher, and the immediate callback to the customer becomes a new implementation mode studied by the call center.

At present, most of call-out systems scan lists of call-out tasks to perform the call-out based on timed scheduling tasks. The call-out is divided into two types, that is, a preview type and a prediction type. The call-out scheme of the prediction type mainly firstly uses IVR (interactive voice response) voice to call through a user, and makes a switch to an agent when the agent is idle. This call-out scheme will result in a circumstance where the user listens to the voice played by the IVR for a long time because the agent is not idle for a long time. The call-out scheme of the preview type may result in a circumstance where the agent is ready, but the last scheduling period is just missed, the call-out may be executed only when the next scheduling period comes, and the user cannot be called back in the time within this period, thereby reducing user experience, and meanwhile since the agent needs to wait for the next scheduling period so as to execute the call-out, an agent utilization rate is reduced.

In the process of implementing the invention, the inventors find that at least the following problems exist in the prior art: the existing call-out scheme has certain defects, and in particular, the existing call-out scheme of the preview type cannot efficiently implement an immediate callback function, reduces an agent utilization rate, and has poor user experience.

SUMMARY OF THE INVENTION

In view of the above, the embodiment of the invention provides a call-out method and apparatus for an immediate callback, an electronic device, and a computer readable medium, and can solve the problem that the existing call-out scheme of the preview type cannot effectively implement an immediate callback, and can improve user experience, increase an agent utilization rate, and reduce a pressure on a system caused by frequent scheduling of timed tasks.

In order to achieve the above objects, according to one aspect of the embodiment of the invention, a call-out method for an immediate callback is provided.

A call-out method for an immediate callback, comprises: receiving an immediate callback request of a user, the immediate callback request including a callback number and submitted service data; determining, according to a pre-stored mapping relationships between a service data and agent's telephone skills, agents processing the submitted service data; and judging whether a ready agent exists in the determined agents, and if so, immediately calling the callback number; otherwise, calling the callback number when there is a ready agent.

Optionally, after receiving the immediate callback request of the user, the method further comprises: verifying validity and service logic correctness of the immediate callback request.

Optionally, judging whether a ready agent exists in the determined agents comprises: judging whether there is a ready notification message sent by the determined agent, and if so, there being a ready agent, otherwise, there being no ready agent.

Optionally, the callback number is called according to a preset call-out policy, the preset call-out policy including: a time limit of the call-out, the number of times of retries and an interval between the retries when the call-out fails, and the maximum limit number of times of the call-out within a preset time period.

Optionally, the agent sends the ready notification message in a manner of a message queue.

According to another aspect of the embodiment of the invention, a call-out apparatus for an immediate callback is provided.

A call-out apparatus for an immediate callback, comprises: a request receiving unit for receiving an immediate callback request of a user, the immediate callback request including a callback number and submitted service data; an agent determining unit for determining, according to pre-stored mapping relationships between a service data and agent's telephone skills, agents processing the submitted service data; and a call-out executing unit for judging whether a ready agent exists in the determined agents, and if so, immediately calling the callback number; otherwise, calling the callback number when there is a ready agent.

Optionally, the apparatus further comprises a request verifying unit for verifying validity and service logic correctness of the immediate callback request.

Optionally, the call-out executing unit is further used for judging whether there is a ready notification message sent by the determined agent, and if so, there being a ready agent, otherwise, there being no ready agent.

Optionally, the call-out executing unit is further used for calling the callback number according to a preset call-out policy, the preset call-out policy including a time limit of the call-out, the number of times of retries and an interval between the retries when the call-out fails, and the maximum limit number of times of the call-out within a preset time period.

Optionally, the agent sends the ready notification message in a manner of a message queue.

According to a further aspect of the embodiment of the invention, an electronic device is provided.

An electronic device, comprises: one or more processors; a memory for storing one or more programs, wherein when the one or more programs are executed by the one or more processors, the one or more processors are made to implement the call-out method for an immediate callback.

According to a further aspect of the embodiment of the invention, a computer readable medium is provided.

A computer readable medium has a computer program stored thereon, the program, when executed by the processor, implementing the call-out method for an immediate callback.

The above one embodiment of the invention has the following advantages or beneficial effects: receiving an immediate callback request of a user, the immediate callback request including a callback number and submitted service data; determining, according to pre-stored mapping relationships between a service data and agent's telephone skills, agents processing the submitted service data; and judging whether a ready agent exists in the determined agents, and if so, immediately calling the callback number; otherwise, calling the callback number when there is a ready agent. The embodiment solves the problem that the existing call-out scheme of the preview type cannot effectively implement an immediate callback, and can improve user experience, increase an agent utilization rate, and reduce a pressure on a system caused by frequent scheduling of timed tasks.

Further effects of the above non-conventional optional manners will be described below by taking specific implementation modes into consideration.

BRIEF DESCRIPTION OF THE DRAWINGS

The drawings are used for a better understanding of the invention, and do not mean improper limitations of the invention. Wherein.

DETAILED DESCRIPTION

The exemplary embodiments of the invention, including various details of the embodiment of the invention, are described below by taking the figures into consideration to facilitate understanding, and shall be considered to be only exemplary ones. Thus, those skilled in the art should recognize that various changes and modifications may be made to the embodiments described herein without departing from the scope and spirit of the invention. Similarly, for clarity and conciseness, descriptions of well-known functions and structures are omitted in the descriptions below.

Figure 1:
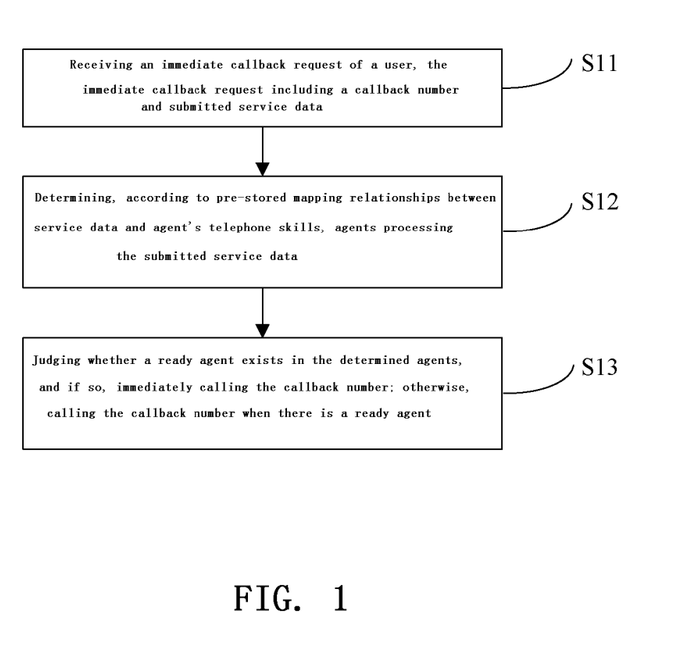
FIG. 1 is a schematic diagram of main steps of a call-out method for an immediate callback according to an embodiment of the invention.

FIG. 1 is a schematic diagram of main steps of a call-out method for a callback according to an embodiment of the invention.

As shown in FIG. 1, the call-out method for an immediate callback according to the embodiment of the invention mainly comprises step S11 to step S13 below.

Step S11: receiving an immediate callback request of a user, the immediate callback request including a callback number and submitted service data.

The immediate callback request may also include information such as a user account (such as, a user's login account, user identification (ID)). The service data may specifically include an order type (such as a mobile phone order, that is, a merchandise order placed by a mobile phone), an order status (such as an outgoing status), an after-sales service order status (such as a pending status), a user level (such as a general-level user, a diamond-level user, etc.), a merchandise type (such as a large household appliance type), a type of a question consulted by a user (types such as consulting an account question, consulting an order question, etc.) and other data.

After the immediate callback request of the user is received, it is also permitted to verify validity and service logic correctness of the immediate callback request. For example, it is verified whether the user's callback number conforms to a rule, and whether two tasks that are called out at the same time are the same callback number, and whether the same account reserves multiple callbacks with the same callback number left.

Step S12: determining, according to pre-stored mapping relationships between a service data and agent's telephone skills, agents processing the submitted service data.

The agent's telephone skill is a telephone skill possessed by the agent, and specifically refers to the ability to process service data of a certain type possessed by the agent. For example, the agent having the telephone skill of the large household appliance indicates that the agent has the ability to process the serve data for the large household appliance. The database pre-stores the mapping relationships between various business data and the agent's telephone skills. For example, as for the service data relating to the order type, assuming that the order type is a mobile phone order (that is, a merchandise order placed by a mobile phone), in the database, there is a mapping relationship between the service data of the mobile phone order and the telephone skill of the mobile phone order, and the agent having the telephone skill of the mobile phone order has the ability to process the service data of the mobile phone order; as for the service data relating to the merchandise type, assuming that the merchandise type is for the large household appliance, in the database, there is a mapping relationship between the merchandise type of the large household appliance and the telephone skill of the large household appliance, and the agent having the telephone skill of the large household appliance has the ability to process the service data of the large household appliance.

According to the order type, the order status, the after-sales service order status, the user level, the merchandise type, the type of a question consulted and other service data inputted by a user, and the pre-stored mapping relationships between the multi-dimensional service data and the telephone skills, the matched telephone skills may be accurately positioned. Examples are given below to introduce the detailed process of determining, according to pre-stored mapping relationships between service data and agent's telephone skills, agents processing the service data submitted by the user.

Considering the service data submitted by the user including the order type and merchandise type data as an example, assuming that the order type is a mobile phone order, and the merchandise type is a large household appliance merchandise, it may be obtained by querying the database according to the mapping relationships between the various service data and the agent's telephone skills pre-stored in the database that: a mapping relationship exists between the service data of the mobile phone order and the telephone skill of the mobile phone order, and a mapping relationship exists between the merchandise type of the large household appliance and the telephone skill of the large household appliance to thereby determine that the agent processing the service data submitted by the user is the agent having the telephone skill of the mobile phone order and the telephone skill of the large household appliance, and the agent has the ability to process the service data of the mobile phone order and the large household appliance merchandise. During an actual processing, the service data submitted by the user also includes more content, for example, the order status, after-sales service order status, user level, type of a question consulted by a user and other data, and each agent generally has multiple telephone skills (that is, ability to process multiple service data). According to actual service requirements, the mapping relationships between the service data and agent's telephone skills may be very complicated, which may be that a mapping relationship exists between a piece of the content in the service data and one telephone skill, for example, a mapping relationship exists between the service data of the mobile phone order and the telephone skill of the mobile phone order; or that a mapping relationship exists between multiple pieces of the content in the service data and one telephone skill, for example, a mapping relationship exists between the service data of the order type formed by the order status and the after-sales service order status as a whole and the telephone skill of the order. Based on the mapping relationships between the various service data and the agent's telephone skills, the matched telephone skills may be accurately positioned to thereby determine the agents capable of processing the service data submitted by the user.

Step S13: judging whether a ready agent exists in the determined agents, and if so, immediately calling the callback number; otherwise, calling the callback number when there is a ready agent.

Wherein, judging whether a ready agent exists in the determined agents specifically includes: judging whether there is a ready notification message sent by the agent processing the service data submitted by the user, if so, there being a ready agent, otherwise, there being no ready agent. When there is a ready notification message sent by the agent processing the service data submitted by the user, the callback number is called immediately, otherwise the ready notification message sent by the agent is waited for, and when there is a ready notification message sent by the agent, the callback number is called. Such immediate callback model driven by a message based on the agent sending a ready notification message can implement an efficient immediate callback.

When the callback number is called, the callback number may be called according to the preset call-out policy, wherein the preset call-out policy may include: a time limit of the call-out, a number of retries and an interval between the retries when the call-out fails, and the maximum limit number of times of the call-out within a preset time period.

The agent processing the service data submitted by the user may specifically send the ready notification message in a manner of a message queue.

The call-out method for an immediate callback according to the embodiment of the invention is implemented by acquiring a ready agent according to telephone skills based on a CTI (Computer Telecommunications Integration) system support. The entire flow is mainly implemented by a portal/app (application), a reservation unit, a call-out unit, a telephone routing unit, a CTI system and a CRM (Customer Relationship Management) customer service system.

Wherein, the portal/app mainly provides items to be served selected by the user, for example, selecting consulting an order, consulting a question and other data, and initiating an immediate callback request, and the immediate callback request may specifically include a callback number and service data to be consulted or processed selected by the user, and may also include information such as user accounts.

The reservation unit mainly receives the immediate callback request initiated by the portal/app, and specifically includes receiving the submitted information such as the user account, the callback number, and the service data to be consulted or processed, and verifying data validity and service logic correctness of the immediate callback request, which may specially include verifying whether the user's callback number does not conform to the rule, for example, the number of digits of the callback number is incorrect, and verifying whether two tasks that are called out at the same time are the same callback number, and whether the same account reserves multiple callbacks with the same callback number left. According to the normal service logic, the callback number that has initiated the immediate callback or reservation callback request cannot initiate an immediate callback request within the unfinished time. If the immediate callback request passes the verification, the telephone skill that the telephone is required to be routed is obtained from the telephone routing unit according to the submitted service data, for example, according to the pre-stored mapping relationships between the service data and the agent's telephone skills, it is judged by the telephone routing unit that the service data of the large household appliance in the immediate callback request is required to be answered by the agent having the telephone skill of the large household appliance. After the telephone skill that the telephone is required to be routed is acquired, the agent processing the service data submitted by the user is determined, and a call-out request is initiated to the call-out unit.

The telephone routing unit mainly provides a function of telephone routing, the input parameters thereof are the service data, and the output ones are the telephone skills matched corresponding to the service data. According to the input service data, more dimensional data may be acquired for accurate routing, for example, according to the order type, order status, after-sales service order status, user level, merchandise type, type of a question consulted by a user and other service data inputted by user, and the pre-stored mapping relationships between the multi-dimensional service data and the telephone skills, the matched telephone skills may be accurately positioned. The specific positioning process has been described in detail in the above step S12, and no unnecessary details are further given herein.

The call-out unit directly interacts with the CTI system, the interaction manner uses socket communication, and the format of the interaction data is a json string. The call-out unit initiates a call-out request to the CTI system according to the set call-out policy, the call-out policy mainly including a time limit of the call-out, a number of retries and an interval between the retries when the call-out fails, and the maximum limit number of times of the call-out within a preset time period. The time limit of the call-out specifies, for example, that the call-out is executed at the working time of 9:00-17:00, and then the call-out is not executed outside the working time, the number of retries when the call-out fails specifies the number of times of the call-out that may be retried within the interval between the retries, and the maximum limit number of times of the call-out within a preset time period specifies, for example, the maximum limit number of times of the call-out executed on the callback number within one day.

The CTI system is a system integrated using multiple functions of telecommunication communication network and computer network based on the VoIP technique (the technique of digitalizing analog signals, and making real-time transmission on IP networks in the form of data packets) and the CTI technique, and combined with an enterprise system to complete comprehensive information services. The CTI system is developed from the traditional Computer Telephony Integration technique, which originally aims to apply the computer technique to the telephone system, so that signaling information in the telephone can be automatically identified, and a predetermined audio file, a transfer incoming call and so on are transmitted to the user by establishing relevant telephone channel connections. Until now, the CTI technique has developed into the "Computer Telecommunication Integration" technique. The CTI system mainly implements functions of a call control and a call allocation, wherein the call control includes managing establishment, maintenance and clean-up of logical calls, and controlling the call status, and the call allocation automatically allocates calls to the most suitable agent resource according to a certain allocation algorithm.

The CRM (Customer Relationship Management) customer service system mainly integrates softphone and enterprise customer management functions to provide agents for use with the ability to provide customers with satisfactory and thoughtful services and improve customer satisfaction. When the agent is ready, the system will automatically call out the user or answer the user's call, and automatically display the service data in the system to facilitate faster communication with the customer.

Figure 2:
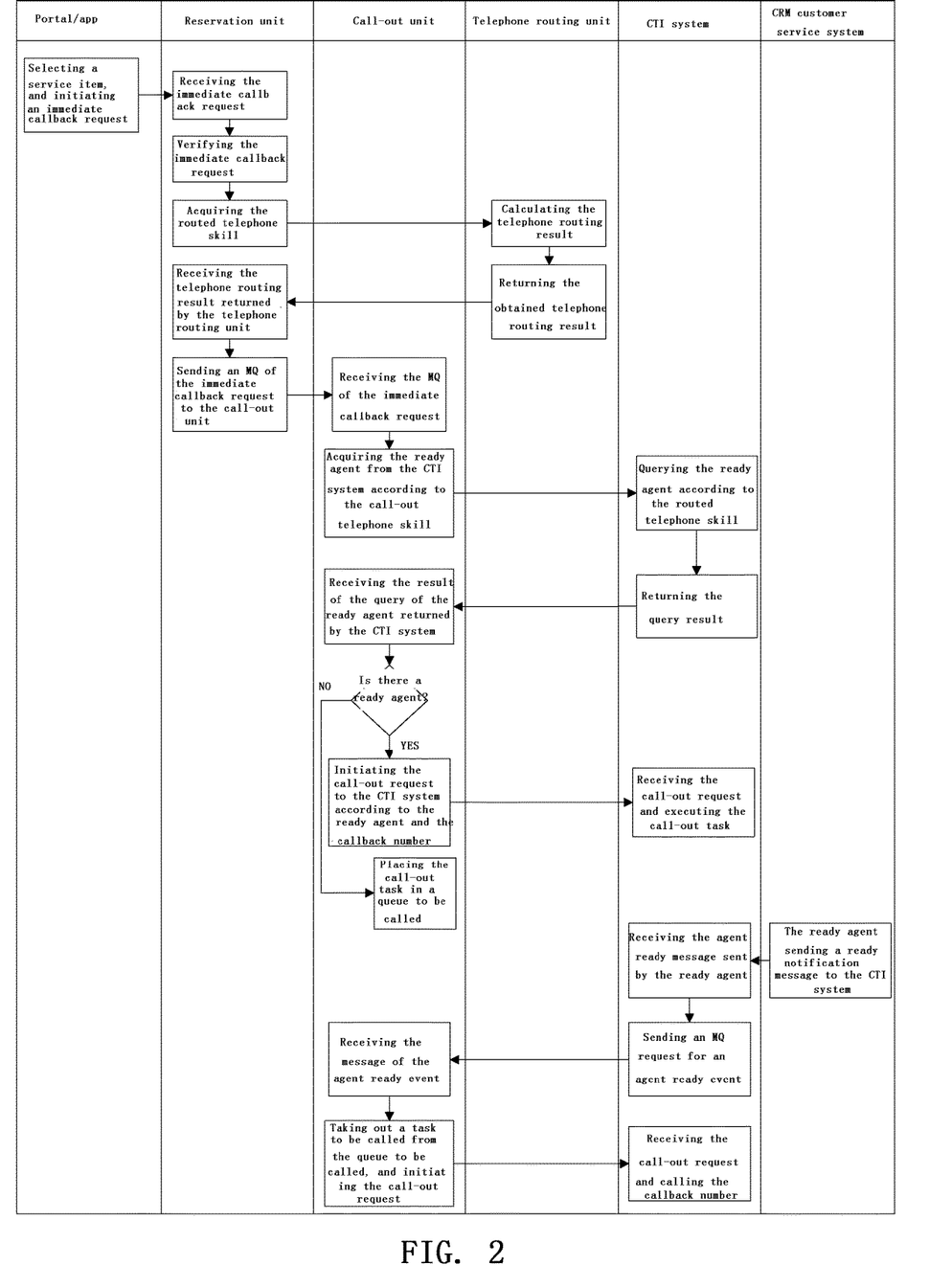
FIG. 2 is a schematic diagram of a preferred call-out flow for an immediate callback according to an embodiment of the invention.

FIG. 2 is a schematic diagram of a preferred call-out flow for an immediate callback according to an embodiment of the invention. As shown in FIG. 2, the method for an immediate callback according to the embodiment of the invention may preferably include the following flows:

After the user selects a service item using the portal or app, an immediate callback request is initiated to the system. The manner of the request may be specifically a request based on webService (web-based service) or an http, and the content in the request may specifically include information such as a user account, a callback number, and service data to be consulted or processed.

The reservation unit of the system receives the immediate callback request, and then performs data verification on the data included in the immediate callback request, including verifying the data validity and service logic correctness of the immediate callback request, for example, verifying whether the user's callback number does not conform to the rule, whether two tasks that are called out at the same time are the same callback number, and whether the same account reserves multiple callbacks with the same callback number left. After the success of the verification, the routed telephone skill is acquired from the telephone routing unit according to the service data.

The telephone routing unit calculates the telephone routing result, which mainly includes positioning the matched telephone skills according to the input service data and the pre-stored mapping relationships between the service data and the telephone skills (the specific positioning process has been described in detail in the above step S12), and returns the obtained telephone routing result.

The reservation unit receives the telephone routing result returned by the telephone routing unit, and sends an MQ (message queue) of the immediate callback request to the call-out unit, and the message queue also has a call-out telephone skill attached to notify the call-out system of the telephone skills of the agents capable of processing the service data submitted by the user.

The call-out unit receives the MQ (message queue) of the immediate callback request, and acquires the ready agent from the CTI system according to the call-out telephone skill in a socket manner.

The CTI system queries the ready agent according to the routed telephone skill, and returns the query result, wherein querying the ready agent is mainly to query the ready notification message sent by the agent having the telephone skill according to the routed telephone skill.

The call-out unit receives the result of the query of the ready agent returned by the CTI system, judges whether a ready agent exits, places the call-out task in a queue to be called if no ready agent exists, and initiates a call-out request to the CTI system according to the ready agent and the callback number if a ready agent exists. The CTI system receives the call-out request, and executes the out-call task.

Wherein, the CTI system receiving the call-out request and executing the call-out task further includes the following interaction process: first, when there is a ready agent, the ready agent initiates a ready request to the CTI system, the ready request may specifically be in the form of a ready notification message, and the agent may initiate the ready request to the CTI system by clicking a corresponding ready button in a softphone strip, wherein the softphone strip is a virtual telephone terminal that may be embedded into a web system that controls the telephone channel based on the SIP (Session Initiation Protocol) protocol, the SIP is a multimedia communication protocol formulated by IETF (Internet Engineering Task Force), which is a text-based application layer control protocol similar to HTTP for creating, modifying and releasing sessions of one or more participants; the CTI system receives a agent ready message sent by the ready agent and sets the status of the ready agent to a ready status; then, the CTI system sends an MQ (message queue) request for an agent ready event to the call-out unit; the call-out unit receives the message of the agent ready event, takes out a task to be called from the queue to be called, and initiates the call-out request to the CTI system according to the ready agent and the callback number in the task to be called; and the CTI system receives the call-out request, and calls the callback number.

The method for an immediate callback according to the embodiment of the invention can implement that the call-out of the preview type effectively implements an immediate callback, improve user experience, increase an agent utilization rate, and also reduce a pressure on a system caused by frequent scheduling of timed tasks.

Figure 3:
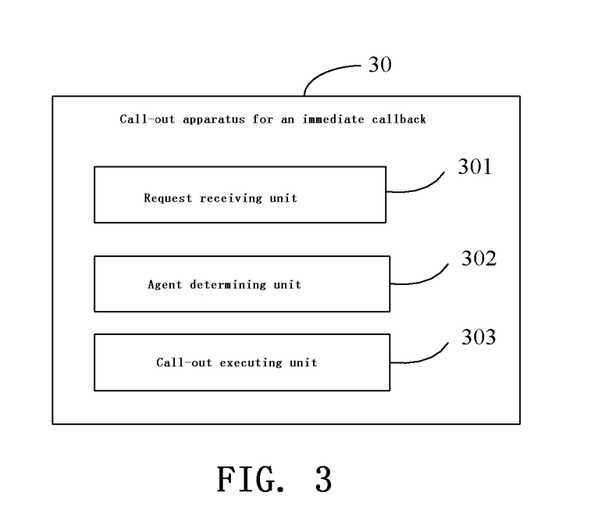
FIG. 3 is a schematic diagram of main units of a call-out apparatus for an immediate callback according to an embodiment of the invention.

FIG. 3 is a schematic diagram of main units of a call-out apparatus for an immediate callback according to an embodiment of the invention.

As shown in FIG. 3, a call-out apparatus 30 for an immediate callback according to the embodiment of the invention mainly comprises: a request receiving unit 301, an agent determining unit 302 and a call-out executing unit 303. Wherein:

The request receiving unit 301 is used for receiving an immediate callback request of a user, the immediate callback request including a callback number and submitted service data.

Specifically, the request receiving unit 301 may receive the immediate callback request of the user through the portal or app.

The agent determining unit 302 is used for determining, according to pre-stored mapping relationships between service data and agent's telephone skills, agents for processing the submitted service data.

Specifically, the agent determining unit 302 may calculate, according to the pre-stored mapping relationships between the service data and the agent's telephone skills, the telephone routing result by the telephone routing unit, and determine, by the phone routing result, the agent capable of processing the submitted service data and having the corresponding circuit routing skill.

The call-out executing unit 303 is used for judging whether a ready agent exists in the agents processing the submitted service data, and if so, immediately calling the callback number; otherwise, calling the callback number when there is a ready agent.

Specifically, the call-out executing unit 303 implements the above functions mainly by interactions between the call-out unit, the CTI system, and the agents. Specifically, the call-out executing unit 303 executes the following interaction process by the call-out unit, the CTI system, and the agents: when there is a ready agent, the ready agent sends a ready notification message to the CTI system, the CTI system receives the ready notification message, and then returns the agent ready result to the call-out unit, the call-out unit determines whether a ready agent exists according to whether there is an agent sending the ready notification message to the CTI system, and if a ready agent exists, the call-out unit sends a call-out request to the CTI system so that the CTI system calls the callback number according to the call-out request; if no ready agent exists, the call-out unit places the call-out task in a queue to be called, and when there is an agent sending the ready notification message to the CTI system, the call-out unit takes out a task to be called from the queue to be called, and initiates the call-out request to the CTI system so that the CTI system calls the callback number according to the call-out request.

The call-out apparatus 30 for an immediate callback may further comprise a request verifying unit, which is mainly used for verifying validity and service logic correctness of the immediate callback request.

Specifically, the request verifying unit may execute the above verifying process by the reservation unit.

The call-out executing unit 303 may be further used for judging whether there is a ready notification message sent by the agent, and if so, there being a ready agent, otherwise, there being no ready agent. Wherein the agent may specifically send the ready notification message in a manner of a message queue.

Moreover, the call-out executing unit may be further used for calling the callback number according to a preset call-out policy, the preset call-out policy including a time limit of the call-out, a number of retries and an interval between the retries when the call-out fails, and the maximum limit number of times of the call-out within a preset time period.

Figure 4:
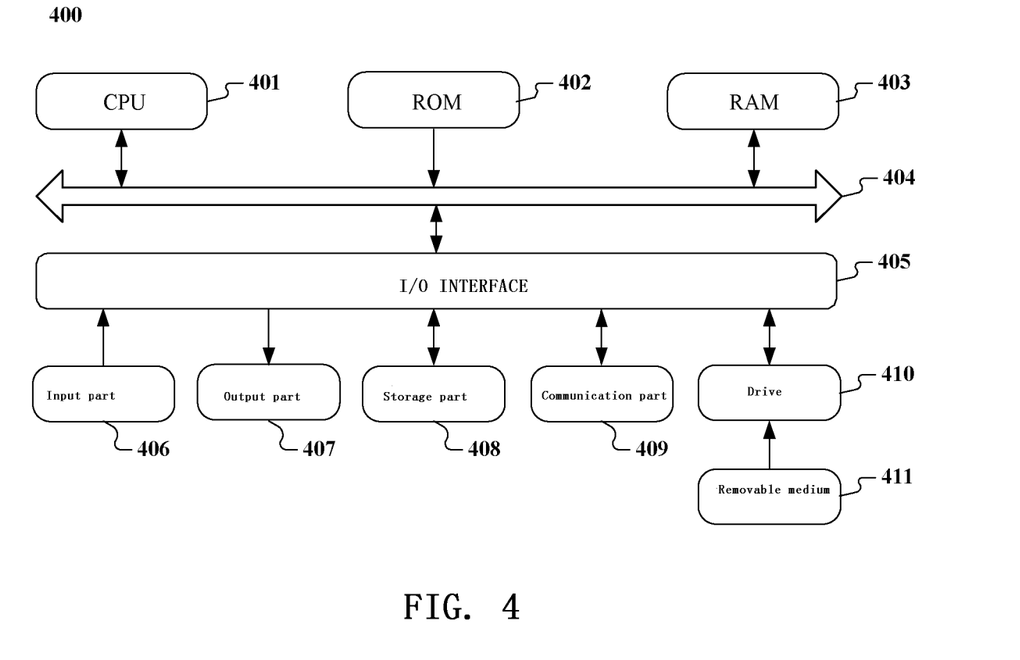
FIG. 4 is a schematic diagram of a structure of a computer system suitable for use in implementing an electronic device according to an embodiment of the invention.

FIG. 4, which shows a schematic diagram of a structure of a computer system 400 suitable for use in implementing an electronic device according to an embodiment of the invention, is referred to below. The electronic device shown in FIG. 4 is only an example, and shall not bring any limitation to the function and scope of use of the embodiment of the application.

As shown in FIG. 4, the computer system 400 includes a central processing unit (CPU) 401, which may implement various proper actions and processings according to a program stored in a read-only memory (ROM) 402 or a program loaded into a random access memory (RAM) 403 from a storage part 408. In the RAM 403, various programs and data required for the operation of the system 400 are also stored. The CPU 401, the ROM 402, and the RAM 403 are connected to each other through a bus 404. An input/output (I/O) interface 405 is also connected to the bus 404.

The following components are connected to the I/O interface 405: an input part 406 including a keyboard, a mouse and so on; an output part 407 including, for example, a cathode ray tube (CRT), a liquid crystal display (LCD) and so on as well as a loudspeaker and so on; the storage part 408 including a hard disk and so on; and a communication part 409 including a network interface card such as a LAN card, a modem and so on. The communication part 409 executes the communication processing via a network such as the Internet. A drive 410 is also connected to the I/O interface 405 as required. A removable medium 411 such as a magnetic disk, an optical disk, a magneto-optical disk, a semiconductor memory and so on is installed on the drive 410 as required so that a computer program read therefrom is installed into the storage part 408 as required.

In particular, the processes described above with reference to the flowcharts may be implemented as a computer software program according to the embodiment of the invention. For example, the embodiment of the invention includes a computer program product, which comprises a computer program carried on a computer readable medium, the computer program including a program code for executing the method as shown in the flowcharts. In such embodiment, the computer program may be downloaded and installed from the network via the communication part 409, and/or installed from the removable medium 411. When the computer program is executed by the central processing unit (CPU) 401, the above functions defined in the system of the application are executed.

It should be noted that the computer readable medium as shown in the invention may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the above. More specific examples of the computer readable storage medium may include, but are not limited to, electrical connection having one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the application, the computer readable storage medium may be any tangible medium that contains or stores a program, which may be used by or in combination with an instruction executing system, apparatus or device. In the application, the computer readable signal medium may include a data signal that is propagated in a baseband or as part of a carrier, carrying a computer readable program code. Such propagated data signal may take a variety of forms including, but not limited to, electromagnetic signals, optical signals, or any suitable combination of the above. The computer readable signal medium may be also any computer readable medium other than the computer readable storage medium, and the computer readable medium may send, propagate, or transmit a program for use by or in combination with the instruction executing system, apparatus, or device. The program code included on the computer readable medium may be transmitted by any suitable medium, including but not limited to wireless, wire, optical cable, RF and so on, or any suitable combination of the above.

The flowcharts and block diagrams in the figures illustrate architectures, functions and operations that may be implemented by the system, method and computer program product according to various embodiments of the invention. In this regard, each block in the flowcharts or block diagrams may represent a unit, a program segment, or a part of a code that includes one or more executable instructions for implementing prescribed logical functions. It should be also noted that in some alternative implementations, the functions marked in the blocks may also occur in an order different from that marked in the drawings. For example, two successively represented blocks may be actually executed substantially in parallel, and they may be sometimes executed in a reverse order, which depends on the functions involved. It is also noted that each block in the block diagrams or flowcharts, and combinations of blocks in the block diagrams or flowcharts may be implemented by a dedicated hardware-based system that executes the prescribed functions or operations, or may be implemented using a combination of dedicated hardware and computer instructions.

The involved units described in the embodiment of the invention may be implemented by software or by hardware. The described units may be also provided in the processor, for example, descriptions may be given as follows: a processor includes a request receiving unit 301, an agent determining unit 302, and a call-out executing unit 303. The names of these units do not constitute limitations of the units themselves under certain circumstances. For example, the request receiving unit may be also described as "a unit for receiving an immediate callback request of a user".

In another aspect, the invention also provides a computer readable medium, which may be included in the device as described in the above embodiment, or may be present independently and not assembled in the device. The above computer readable medium carries one or more programs, and when the one or more programs are executed by the device, the device is made to: receive an immediate callback request of a user, the immediate callback request including a callback number and submitted service data; determine, according to pre-stored mapping relationships between service data and agent's telephone skills, agents processing the submitted service data; and judge whether a ready agent exists in the determined agents, and if so, immediately call the callback number; otherwise, call the callback number when there is a ready agent.

The technical solution of the embodiment of the invention receives an immediate callback request of a user, the immediate callback request including a callback number and submitted service data; determines, according to pre-stored mapping relationships between service data and agent's telephone skills, agents processing the submitted service data; judges whether a ready agent exists in the determined agents, and if so, immediately calls the callback number; otherwise, calls the callback number when there is a ready agent. It solves the problem that the existing call-out scheme of the preview type cannot effectively implement an immediate callback, and can improve user experience, increase an agent utilization rate, and reduce a pressure on a system caused by frequent scheduling of timed tasks.

The above specific implementation modes do not constitute limitations of the scope of protection of the invention. Those skilled in the art should understand that various modifications, combinations, sub-combinations and substitutions may occur depending on design requirements and other factors. Any modifications, equivalent substitutions, improvements and so on made within the spirit and principle of the invention should be included within the scope of protection of the invention.

The invention claimed is:

1. A call-out method for an immediate callback, comprising:
   receiving an immediate callback request of a user, the immediate callback request including a callback number and submitted service data;
   determining, according to pre-stored mapping relationships between a service data and agent's telephone skills, agents processing the submitted service data; and
   judging whether a ready agent exists in the determined agents, and if so, immediately calling the callback number; otherwise, calling the callback number when there is a ready agent,
   wherein the judging whether a ready agent exists in the determined agents comprises:
      judging whether there is a ready notification message sent by the determined agent, and if so, there being a ready agent, otherwise there being no ready agent, and
   wherein the agent sends the ready notification message in a manner of a message queue.

2. The method according to claim 1, wherein after receiving the immediate callback request of the user, the method further comprises:
   verifying validity and service logic correctness of the immediate callback request.

3. The method according to claim 1, wherein the callback number is called according to a preset call-out policy, the preset call-out policy including: a time limit of the call-out, the number of times of retries and an interval between the retries when the call-out fails, and the maximum limit number of times of the call-out within a preset time period.

4. A call-out apparatus for an immediate callback, comprising:
   at least one processor; and
   a memory storing instructions, the instructions when executed by the at least one processor, cause the at least one processor to perform operations, the operations comprising:
      receiving an immediate callback request of a user, the immediate callback request including a callback number and submitted service data;
      determining, according to pre-stored mapping relationships between a service data and agent's telephone skills, agents processing the submitted service data; and
      judging whether a ready agent exists in the determined agents, and if so, immediately calling the callback number; otherwise, calling the callback number when there is a ready agent,
   wherein the judging whether a ready agent exists comprises:
      judging whether there is a ready notification message sent by the determined agent, and if so, there being a ready agent, otherwise, there being no ready agent, and
   wherein the agent sends the ready notification message in a manner of a message queue.

5. The apparatus according to claim 4, wherein the at least one processor is further configured to verify validity and service logic correctness of the immediate callback request.

6. The apparatus according to claim 4, wherein the at least one processor is configured to call the callback number according to a preset call-out policy, the preset call-out policy including a time limit of the call-out, the number of times of retries and an interval between the retries when the call-out fails, and the maximum limit number of times of the call-out within a preset time period.

7. A non-transitory computer readable medium having a computer program stored thereon, wherein the computer program, when executed by the processor, causes the processor to perform operations, the operations comprising:
 receiving an immediate callback request of a user, the immediate callback request including a callback number and submitted service data;
 determining, according to pre-stored mapping relationships between a service data and agent's telephone skills, agents processing the submitted service data; and
 judging whether a ready agent exists in the determined agents, and if so, immediately calling the callback number; otherwise, calling the callback number when there is a ready agent,
 wherein the judging whether a ready agent exists comprises:
  judging whether there is a ready notification message sent by the determined agent, and if so, there being a ready agent, otherwise, there being no ready agent, and
 wherein the agent sends the ready notification message in a manner of a message queue.

8. The non-transitory computer readable medium according to claim 7, wherein after receiving the immediate callback request of the user, the operations further comprise:
 verifying validity and service logic correctness of the immediate callback request.

9. The non-transitory computer readable medium according to claim 7, wherein the callback number is called according to a preset call-out policy, the preset call-out policy including: a time limit of the call-out, the number of times of retries and an interval between the retries when the call-out fails, and the maximum limit number of times of the call-out within a preset time period.

* * * * *